United States Patent
Wang et al.

(10) Patent No.: US 8,503,878 B2
(45) Date of Patent: Aug. 6, 2013

(54) FLOW-SUBCARRIER MAPPING IN OPTICAL ORTHOGONAL FREQUENCY DIVISION MULTIPLEXING

(75) Inventors: Chonggang Wang, Plainsboro, NJ (US); Wei Wei, Plainsboro, NJ (US); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 646 days.

(21) Appl. No.: 12/700,979

(22) Filed: Feb. 5, 2010

(65) Prior Publication Data

US 2010/0232795 A1 Sep. 16, 2010

Related U.S. Application Data

(60) Provisional application No. 61/158,936, filed on Mar. 10, 2009.

(51) Int. Cl.
*H04J 14/00* (2006.01)

(52) U.S. Cl.
USPC ............ 398/49; 398/45; 398/48; 398/50; 398/51; 398/56; 398/57; 398/76; 398/79; 370/216; 370/217; 370/230; 370/225; 370/228; 375/260

(58) Field of Classification Search
USPC .............. 398/76, 79, 45, 46, 48, 49, 50, 56, 398/53, 51, 58, 25, 59, 75, 47, 52, 54, 55, 398/57; 370/230, 235, 395.4, 208, 216, 217, 370/225, 228; 375/260
See application file for complete search history.

(56) References Cited

U.S. PATENT DOCUMENTS

| | | | |
|---|---|---|---|
| 6,889,007 B1 * | 5/2005 | Wang et al. | 398/79 |
| 7,245,830 B2 * | 7/2007 | Charcranoon et al. | 398/51 |
| 8,155,529 B2 * | 4/2012 | Rhee et al. | 398/140 |
| 2003/0063348 A1 * | 4/2003 | Posey, Jr. | 359/139 |
| 2004/0170431 A1 * | 9/2004 | Maciocco et al. | 398/48 |

* cited by examiner

*Primary Examiner* — Hanh Phan
(74) *Attorney, Agent, or Firm* — Joseph Kolodka

(57) ABSTRACT

Each of a plurality of data flows is classified as having a respective data flow type, and each data flow is assigned to one of a plurality of subcarrier groups, based on the data flow's type, wherein each subcarrier group comprises a respective plurality of subcarriers. First data flows assigned to a first subcarrier group are transmitted exclusively on respective subcarriers in the first subcarrier group, and second data flows assigned to a second subcarrier group are transmitted together on all of the subcarriers in the second subcarrier group.

19 Claims, 7 Drawing Sheets

FLOW-SUBCARRIER MAPPING IN OPTICAL ORTHOGONAL FREQUENCY DIVISION MULTIPLEXING

RELATED APPLICATIONS

This application claims the benefit of U.S. Provisional Application No. 61/158,936 filed on Mar. 10, 2009, which is incorporated herein by reference.

BACKGROUND OF THE INVENTION

The present invention relates generally to fiber optic transmission (transport) systems, and more particularly to the use of orthogonal frequency division multiplexing (OFDM) in optical networks.

Optical OFDM provides sub-wavelength channels through orthogonal subcarriers and offers high flexibility in traffic grooming, sub-wavelength allocation, network and link virtualization. Optical OFDM has been used in a variety of different networks including in access/metro networks, home networks, core networks, and virtual passive optical networks.

For example, when OFDM techniques are used to transmit optical signals in an optical core network having edge routers, data flows transmitted from an ingress edge router to another peer egress edge router travel through the optical domain on a wavelength. The wavelength may contain a large number of OFDM subcarriers. Multiple data flows transmitted within the network may be mapped to respective OFDM subcarriers and carried on a single wavelength

BRIEF SUMMARY OF THE INVENTION

In an embodiment of the invention, a method of transmitting data over a communication network is provided, wherein a plurality of data flows are carried by respective subcarriers using orthogonal frequency division multiplexing. The method comprises classifying each of a plurality of data flows as having a respective data flow type, and assigning each data flow to one of a plurality of subcarrier groups, based on the data flow's type, wherein each subcarrier group comprises a respective plurality of subcarriers. The method further comprises transmitting first data flows assigned to a first subcarrier group exclusively on respective subcarriers in the first subcarrier group, and transmitting second data flows assigned to a second subcarrier group together on all of the subcarriers in the second subcarrier group.

The communication network may comprise an optical network. The step of classifying each of a plurality of data flows as having a respective data flow type may further comprise classifying each data flow based at least in part on whether or not the data flow has a predictable data rate. The step of classifying each of a plurality of data flows as having a respective data flow type may further comprise classifying each data flow based at least in part on whether or not the data flow needs protection. The step of classifying each of a plurality of data flows as having a respective data flow type may further comprise classifying each data flow as having a data flow type selected from: a first data flow type that does not have a predictable data rate and needs protection, a second data flow type that has a predictable data rate and needs protection, a third data flow type that has a predictable data rate and does not need protection, and a fourth data flow type that does not have a predictable data rate and does not need protection.

The step of assigning each data flow to one of a plurality of subcarrier groups may further comprise assigning data flows of the first data flow type to the first subcarrier group, assigning data flows of the second and third data flow types to the second subcarrier group, and assigning data flows of the fourth data flow type to a third subcarrier group.

The method may further comprise transmitting third data flows assigned to the third subcarrier together on all of the subcarriers in the third subcarrier group. The method may further comprise re-assigning a subcarrier that is not in the first subcarrier group to the first subcarrier group when the subcarrier becomes idle. The method may further comprise re-assigning a subcarrier that is in the first subcarrier group to the second or third subcarrier group when the subcarrier becomes idle.

The communication network may comprise at least one of an in access/metro optical network, a home optical network, a core optical network, and a virtual passive optical network.

In another embodiment of the invention, an apparatus for transmitting data over a communication network is provided, wherein a plurality of data flows are carried by respective subcarriers using orthogonal frequency division multiplexing. The apparatus comprises means for classifying each of a plurality of data flows as having a respective data flow type, and means for assigning each data flow to one of a plurality of subcarrier groups, based on the data flow's type, wherein each subcarrier group comprises a respective plurality of subcarriers. The apparatus further comprises means for transmitting first data flows assigned to a first subcarrier group exclusively on respective subcarriers in the first subcarrier group, and means for transmitting second data flows assigned to a second subcarrier group together on all of the subcarriers in the second subcarrier group.

In another embodiment of the invention, a system for transmitting data over a communication network is provided, wherein a plurality of data flows are carried within the network by respective subcarriers using orthogonal frequency division multiplexing. The system comprises at least one processor configured to classify each of a plurality of data flows as having a respective data flow type and assign each data flow to one of a plurality of subcarrier groups, based on the data flow's type, wherein each subcarrier group comprises a respective plurality of subcarriers. The system further comprises at least one interface configured to transmit first data flows assigned to a first subcarrier group exclusively on respective subcarriers in the first subcarrier group, and transmit second data flows assigned to a second subcarrier group together on all of the subcarriers in the second subcarrier group.

DETAILED DESCRIPTION

Methods and systems described herein may be used in a variety of different types of optical communication networks including, without limitation, in access/metro networks, home networks, core networks, and virtual passive optical networks.

Figure 1:
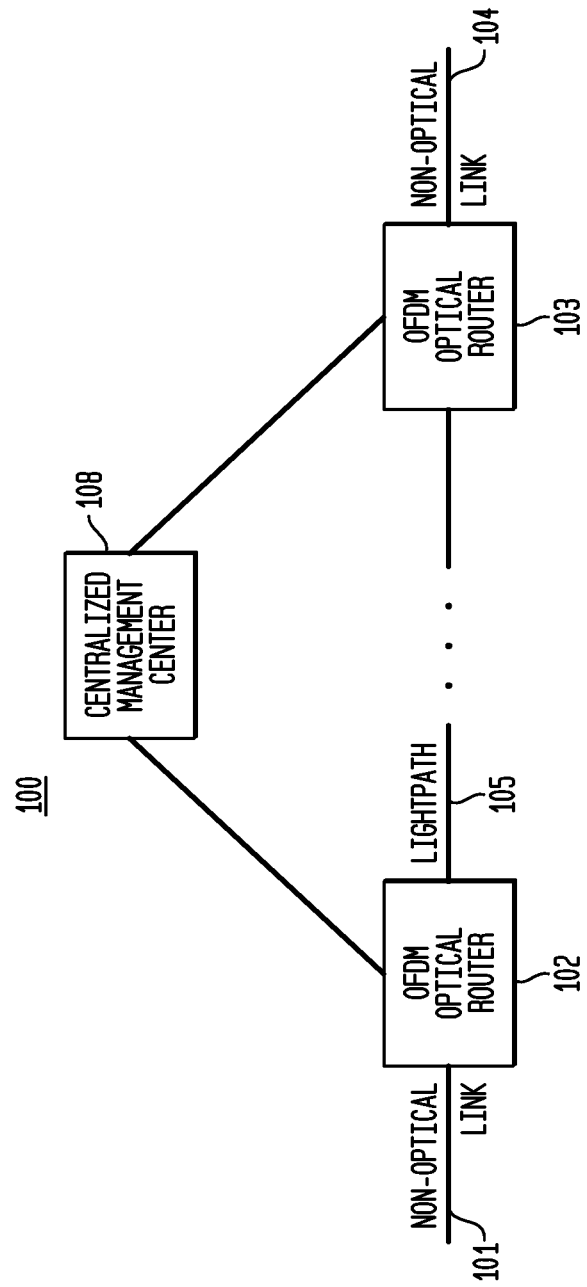
FIG. 1 is an example of a communication system 100, in accordance with an embodiment of the invention.

FIG. 1 is an example of a communication system 100, in accordance with an exemplary embodiment of the invention. Optical orthogonal frequency division multiplexing (OFDM) routers 102, 103 are edge routers in an OFDM-based optical network. Router 102 receives data flows via a non-optical link 101 (ingress point). One or more lightpaths 105 are established to transmit the flows to edge router 103, which receives the data flows and transmits the data flows via a non-optical link 104 (egress point). Flow-subcarrier mapping is performed at ingress router 102 separately for each wavelength transmitted via lightpath 105 and egress router 103 is notified of the flow-subcarrier mapping results to enable it to perform electrical OFDM demodulation correctly and recover packets for each flow. This may be done by direct communication between ingress router 102 and egress router 103, or by indirect communication via a centralized management center 108.

In the exemplary embodiment, lightpath 105 may span multiple physical hops in the optical domain. Lightpath 105 may corresponds to a wavelength, for example. A flow-subcarrier mapping is performed at ingress router 102 to allocate subcarriers of this wavelength for flows carried in lightpath 105. In other embodiments, centralized management center 108 may conduct routing and wavelength assignment. Note that for ring-based optical networks, ingress router 102 may use the same wavelength for connections to multiple routers on the same ring. In such case, ingress router 102 may inform all such routers of the mapping results.

Figure 2:
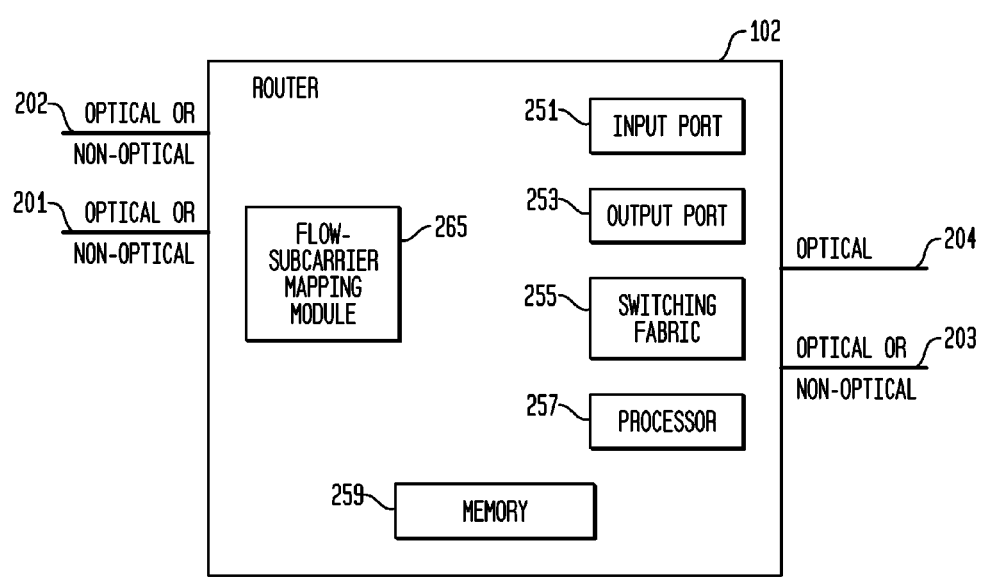
FIG. 2 is a block diagram showing exemplary components of a router, in accordance with an exemplary embodiment of the invention.

FIG. 2 is a block diagram showing exemplary components of router 102, in accordance with an exemplary embodiment of the invention. Router 102 facilitates the transmission of optical communication signals between various components within communication system 100. Router 102 may comprise hardware, software, or a combination of hardware and software.

Router 102 may receive data flows in the form of packets. Packets may comprise information identifying a destination component external to router 102. The packets may comprise, for example, Internet Protocol (IP) packets or a Transmission Control Protocol (TCP) packets. IP packets and TCP packets are known.

In the exemplary embodiment of FIG. 2, router 102 comprises an input port 251, an output port 253, a switching fabric 255, a processor 257, and a memory 259. Input port 251 comprises an interface for receiving input data flows. Input port 251 may comprise a plurality of line cards, for example. Switching fabric 255 connects input port 251 and output port 253. Output port 253 comprises an interface for transmitting output data flows. Output port 253 stores packets and transmits packets on respective output links. Processor 257 controls the operation of various components of router 102, and may direct data flows according to routing protocols. Memory 259 may comprise a computer readable medium, such as a magnetic disk, magnetic tape, or optical disk, that includes instructions in the form of computer code that may be executed by processor 257 to perform various functions. In other embodiments, router 102 may comprise additional components.

Router 102 transmits and receives signals via at least one optical link 204 and one or more additional links 201, 202, 203 which may be optical or non-optical links. Wavelength division multiplexing (WDM) techniques and optical orthogonal frequency division multiplexing (optical OFDM) techniques are used to transmit data flows via optical link 204. WDM and optical OFDM techniques may also be used on other links. While only four links 201, 202, 203, 204 are shown in FIG. 2, router 102 may comprise more or fewer links than shown.

Figure 3:
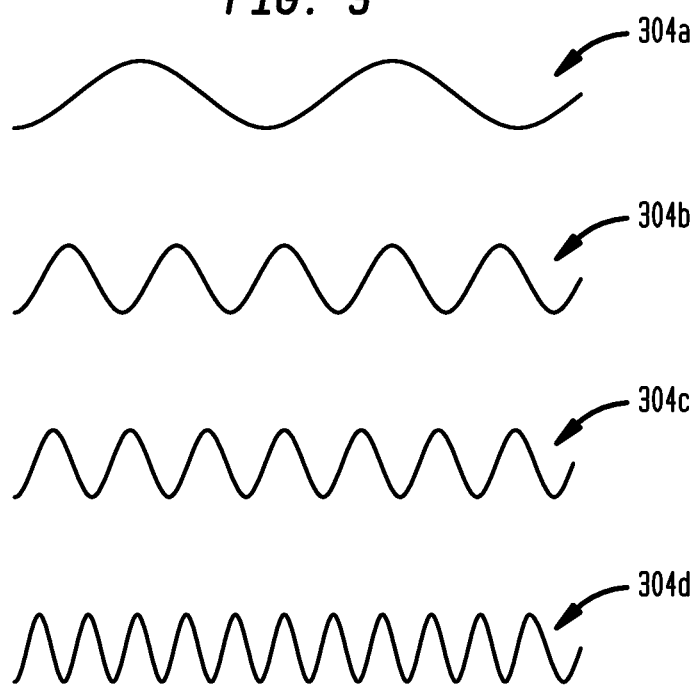
FIG. 3 shows an example of multiple signals having different wavelengths that may be carried simultaneously on a single optical link, in accordance with an embodiment of the invention.

Use of WDM allows multiple signals having different wavelengths to be carried simultaneously over a single optical link, such as optical link 204. FIG. 3 shows an example of four signals 304$a$, 304$b$, 304$c$, and 304$d$ having four different wavelengths that may be carried simultaneously on a single optical link, in accordance with an embodiment of the invention. FIG. 3 is illustrative only and is not intended to be limiting. For example, while only four wavelengths are shown in FIG. 3, more or fewer wavelengths may be carried simultaneously over a single optical link. Use of WDM is known.

Use of optical OFDM allows multiple orthogonal subcarriers to be carried via a single wavelength. A subcarrier is a separate digital signal carrying a respective data stream, within a transmission that carries data. In many OFDM-based systems, a large number of closely-spaced orthogonal subcarriers are used to carry respective data streams. The data streams may be divided into several parallel data streams or channels, one for each sub-carrier. Each sub-carrier may be modulated with a conventional modulation scheme, such as quadrature amplitude modulation or phase-shift keying at a low symbol rate, maintaining total data rates similar to conventional single-carrier modulation schemes in the same bandwidth.

Figure 4:
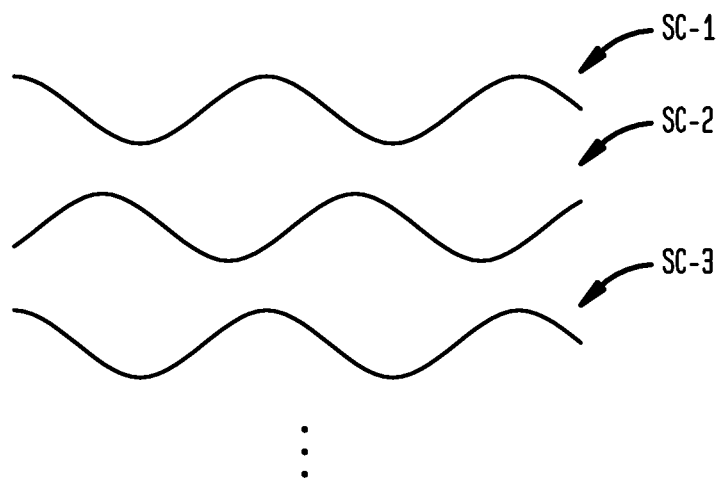
FIG. 4 shows an example of multiple subcarriers that may be carried via a single wavelength in an optical signal, in accordance with an embodiment of the invention.

FIG. 4 shows an example of three subcarriers SC-1, SC-2, and SC-3 that may be carried via a single wavelength of an optical signal, in accordance with an embodiment of the invention. FIG. 4 is illustrative only and is not intended to be limiting. For example, while only three subcarriers are shown in FIG. 4, more or fewer subcarriers may be carried simultaneously via a single wavelength.

Referring again to FIG. 2, router 102 also comprises a flow-subcarrier mapping module 265. Mapping module 265 maps incoming data flows to subcarriers. Mapping module 265 may maintain one or more mapping tables in memory 259, for example. Mapping module 265 may comprise software, hardware, or a combination of hardware and software. In one example, mapping module 265 comprises instructions in the form of computer code that are executed by processor 257. In exemplary embodiments of the invention, mapping module 265 may map data flows to subcarriers in accordance with the methods and apparatus described below.

There is a need for improved methods and apparatus for mapping data flows to subcarriers in communication systems that utilize optical OFDM techniques to transmit information. Accordingly, various methods and apparatus for mapping data flows to subcarriers in optical OFDM systems are described herein. Methods described below may be performed by mapping module 265, for example. In other embodiments, methods described below may be performed by appropriately configured devices located at centralized management center 108 or at other locations.

In an exemplary embodiment, suppose router 102 has L≧1 optical links. Each fiber link supports up to W>1 wavelength and each wavelength can carry M>1 optical OFDM subcarriers. Depending on the modulation scheme being used, each subcarrier could support several levels of data rate R. In one example, R=10 Mbps. For purposes of the discussion below, $w_{k,l}$ is the $k^{th}$ wavelength on the $l^{th}$ link, where 1≦k≦W and 1≦l≦L. Similarly, $s_{j,k,l}$ is the $j^{th}$ subcarrier of the $k^{th}$ wavelength on the $l^{th}$ link, where 1≦j≦M.

For each wavelength $w_{k,l}$ on the output link l, there are N traffic flows ($f_i$, 1≦i≦N) to be routed through. In this example, router 102 has optical-electronic-optical (OEO) conversion so that each traffic flow $f_i$ coming in from a non-optical link or one (or more than one) subcarrier over the other optical input link l' could be transmitted via link/using any available subcarrier $s_{j,k,l}$. In this discussion, a constant packet size for each flow is assumed. If $\mu_i$ is the service rate allocated to a flow $f_i$, then its traffic intensity would be $$\rho_i = \frac{\lambda_i}{\mu_i}.$$

It is preferable that $\lambda_i < \mu_i$ or $\rho_i < 1.0$ to avoid congestion and guarantee that the flow can be served without any packet loss. For example, if each flow is supposed to occupy one subcarrier, $\lambda_i$ should be less than R.

Since there are M subcarriers available on each wavelength $w_{k,l}$ of output link and N traffic flows to be routed through the wavelength, there is a need for methods and apparatus for determining how to use the M subcarriers and how to map N traffic flows to M subcarriers. The remainder of this discussion pertains to intra-wavelength mapping rather than inter-wavelength mapping; the selection of wavelength is assumed to be performed by appropriate routing and wavelength selection algorithms. Therefore, in the remainder of this discussion $s_j$ will be used to denote a subcarrier instead of $s_{j,k,l}$.

Figure 5:
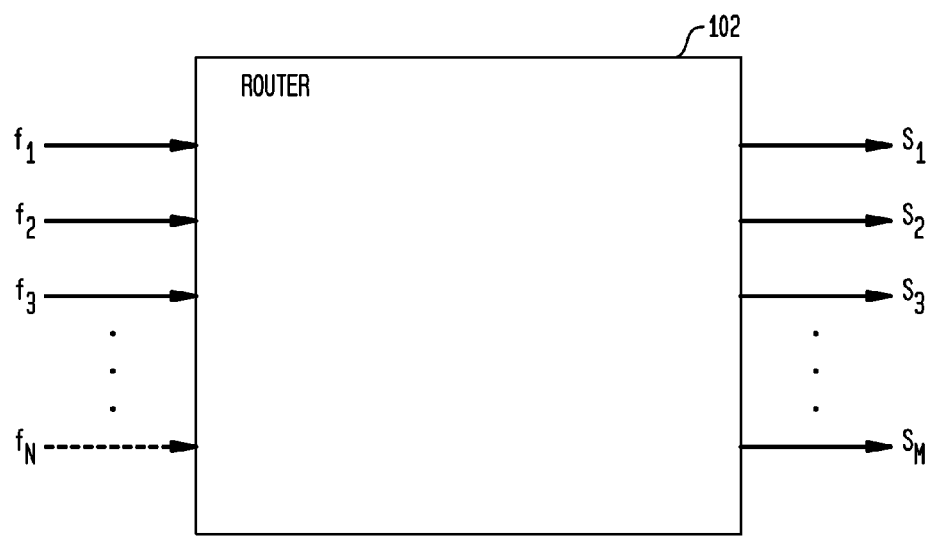
FIG. 5 illustrates a plurality of incoming data flows received by a router, and a plurality of subcarriers on which the data flows are carried, in accordance with an exemplary embodiment of the invention.

FIG. 5 illustrates a plurality of incoming data flows received by router 102, and a plurality of subcarriers on which the data flows are carried, in accordance with an exemplary embodiment of the invention. In particular, N data flows $f_1 \ldots f_N$ need to be carried by M subcarriers $S1, \ldots, S_M$, via a single wavelength. A single data flow may be mapped to one or to multiple subcarriers. Let the N×M matrix $I=(I_{i,j})_{N \times M}$ denote the mapping results and $I_{i,j}$ be the indicator variable. $I_{i,j}=1$ means the ith data flow is mapped to the $j^{th}$ subcarrier and $I_{i,j}=0$ implies that the $i^{th}$ data flow is not mapped to the $j^{th}$ subcarrier. Note that each subcarrier may be shared by multiple flows, which means that multiple flows may be mapped to a single subcarrier. In addition, each data flow may be carried on one or more than one of M subcarriers simultaneously. For example, if a flow $f_i$ has $\lambda_i > R$, it will be mapped to more than one subcarrier. If a flow is mapped to multiple subcarriers, a determination must be made as to how much traffic from the flow is assigned to each subcarrier. For this purpose, $P_{i,j}$ is defined as the percentage of the $i^{th}$ data flow's traffic that is assigned to the $j^{th}$ subcarrier. If $I_{i,j}=0$, $P_{i,j}=0$. If $I_{i,j}=1$, $P_{i,j}>0$. For example, suppose a flow $f_i$ is mapped to two subcarriers $s_j$ and $s_{j'}$. In this example I(i,j)=1 and I(i,j')=1. However, there are two possible values for P(i,j). If $f_i$ is carried by both subcarriers together as a virtual single subcarrier, both P(i,j) and P(i,j') will be 100%. If both subcarriers are used as two separate channels and packets from $f_i$ are transmitted via each subcarrier according to a predetermined percentage (e.g., 20% to subcarrier $s_j$ and 80% to subcarrier $s_{j'}$), then P(i,j)=20% and P(i,j')=80%. Therefore, $I=(I_{i,j})_{N \times M}$ is the mapping matrix and $P=(P_{i,j})_{N \times M}$ is the distribution matrix. Both matrices must be determined to implement a flow-subcarrier mapping (FSM) strategy.

In embodiments of the invention, an FSM strategy may be selected based on the current needs of the system or users. If providing protection between data flows is a priority, it may be preferable to assign flows to different subcarriers. If improving overall throughput of the wavelength pipe is a priority, it may be preferable to allow all data flows to share all subcarriers together.

Given the above definitions and assumptions, the FSM objective may be formulated as set forth below:

$$\text{Maximize } (U) \quad (1)$$

$$\text{Subject to the following constraints:} \quad (2)$$

$$(a) \; 0 \leq \sum_{1 \leq j \leq M} I_{i,j} \leq M, \; \forall \; 1 \leq i \leq N,$$

$$(b) \; \sum_{1 \leq j \leq M} P_{i,j} \leq 1.0, \; \forall \; 1 \leq i \leq N,$$

$$(c) \; \sum_{1 \leq i \leq N} (\lambda_i^* P_{i,j}) < R, \; \forall \; 1 \leq j \leq M,$$

$$(d) \; \sum_{1 \leq i \leq N} \lambda_i < M * R.$$

Eq. 2 specifies four constraints to the FSM objective. Eq. 2(a) implies that each flow can be assigned at most M subcarriers or could be rejected due to unavailability of subcarriers. Eq. 2(b) shows that a flow could be totally $$\left( \sum_j P_{i,j} = 1.0 \right)$$

or partially $$\left( \sum_j P_{i,j} < 1.0 \right)$$

mapped to subcarriers. Eq. 2(c) means that the total traffic rate assigned to a subcarrier should not exceed its available rate R. Finally, Eq. 2(d) means that the total summation of traffic intensity must be smaller than the total rate of all subcarriers; here we suppose admission control is deployed to guarantee this constraint. If there is no admission control, Eq. 2(d) does not exist. The objective is to maximize the utility U, which could be total throughput, average link utility, or packet loss ratio due to buffer overflow, subject to those constraints.

Figure 6:
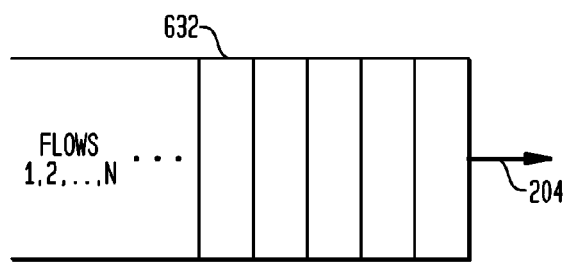
FIG. 6 is an illustration of a signal in which data flows are transmitted by subcarriers in accordance with a complete sharing strategy, in accordance with an embodiment of the invention.
Figure 7:
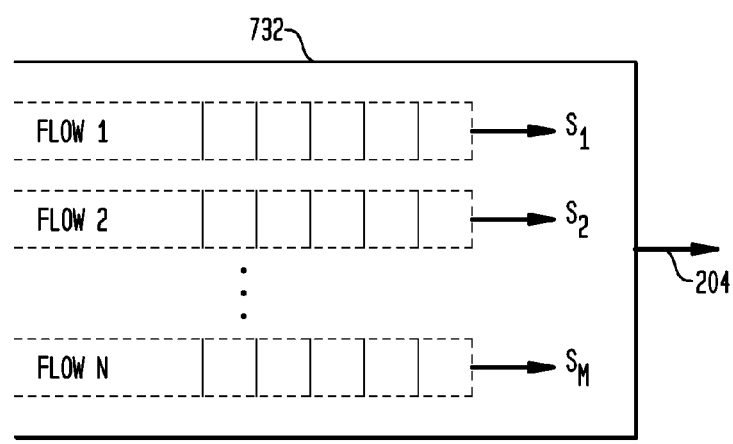
FIG. 7 is an illustration of a signal in which data flows are transmitted by subcarriers in accordance with a complete separation strategy, in accordance with an embodiment of the invention.

Two extreme mapping strategies are described below: Complete Sharing (CSH) and Complete Separation (CSP). FIG. 6 is an illustration of a signal in which data flows are transmitted by subcarriers in accordance with a Complete Sharing strategy, in accordance with an embodiment of the invention. Flows 1, . . . , N share all subcarriers in signal 632, which may be transmitted via link 204. Flows 1, . . . , N are transmitted in such a manner that the flows share subcarriers in the signal. In one example, Flows 1, . . . , N are transmitted together on all subcarriers. FIG. 7 is an illustration of a signal in which data flows are transmitted by subcarriers in accordance with a Complete Separation strategy, in accordance with an embodiment of the invention. Signal 732, which may be transmitted via link 204, comprises subcarriers $s_1, \ldots, s_M$. Data flows 1, 2, . . . , N are carried respectively, and separately, by subcarriers $s_1, \ldots s_M$. Each data flow is carried exclusively on a respective subcarrier. For example, flow 1 is carried by subcarrier $s_1$.

In this discussion, it is assumed that M>N>1. In the discussion below, flow service time is defined as the average total time that a packet of a flow spends between when it arrives at the output link and when it is completely transmitted out. Subcarrier utilization (SU) is defined as the ratio of busy time summation ($T_{busy}$) of all subcarriers during the total time (T) considered, i.e., $$SU = \frac{T_{busy}}{T}.$$

The long term utilization will be $$\lim_T \to \infty \frac{T_{busy}}{T}.$$

In a CSP strategy, each flow is assigned a subcarrier and sits in different queues. In other words, each subcarrier has only one flow. As a result, $$\sum_{1 \le i \le N} I(i, j) \le 1$$

for each $1 \le j \le M$. In contrast, a CSH approach puts all flows into one queue and lets them share subcarriers together. Therefore, for any i and j, I(i, j)=1 and P(i, j)=100%.

A CSP strategy may be advantageous for realizing link virtualization and providing protection among flows even though there is no admission control and some flows are malicious. In contrast, a CSH strategy may recognize all subcarriers together as a single pipe and put all incoming flows to share it, such as, according to a first-come-first-serve (FCFS) principal. Since all flows are put together in CSH, there is no protection provided to flows. However, CSH could have the advantage of reducing wait time and improving link utilization.

In some conditions, CSH may result in shorter service time and higher subcarrier utilization. However, CSH offers relatively low security compared to CSP. CSP, in contrast, may offer improved link virtualization, protection and security.

In accordance with embodiments of the invention, data flows are mapped to subcarriers using a strategy referred to as class-based flow-subcarrier mapping (CFSM). Exemplary embodiments illustrating use of the CFSM strategy are described below.

Data flows may have different requirements in virtual link protection. Some flows need varying degrees of protection while others do not need protection. In addition, flows may be malicious flows which generate unexpected a high packet arrival rate, or normal flows with predictable and controllable data rates. The CFSM technique classifies flows into the following four types:

(1) Type I Flows: Flows of this type need protection. However, their data rate is unpredictable and they could be malicious flows. In this discussion, a data flow is referred to as predictable if its data rate can be controlled through certain traffic policing or admission controls (e.g. leaky-bucket algorithms) to be below a predefined value.

(2) Type II Flows: These flows require protection as well. They are normal flows and generate a predictable data rate.

(3) Type III Flows: This category represents flows that they need no protection but their data rate is predictable. Those flows are normal flows and are not harmful to other flows.

(4) Type IV Flows: Type IV flows do not need protection; however, they may be malicious and have unpredictable data rates.

Since these four types of flows demonstrate different properties in terms of their need for protection and the predictability of their data rates, it is advantageous to use a different flow-subcarrier mapping strategy for each of them. Accordingly, the CFSM strategy jointly considers flow protection, subcarrier utilization and service time, and employs the follow strategies for flow-subcarrier mapping.

In accordance with an embodiment of the invention, all subcarriers are grouped into three pools: Pool A, Pool B and Pool C. Each pool contains a selected number of subcarriers to which flows are assigned.

Each Type I flow is mapped to different subcarriers selected from Pool A. Type I flows are assigned to subcarriers in accordance with the Complete Separation (CSP) strategy discussed above. A Type I flow may be mapped to more than one subcarrier according to their requested data rate. Mapping each Type I flows onto different subcarriers provides not only protection for the flows themselves, but also prevents the flows from impacting other flows.

Type II flows are assigned to the subcarriers in Pool B in accordance with the Complete Sharing (CSH) strategy discussed above. Because their date rates are predictable and not harmful to each other, Type II flows are placed together and assigned to share all subcarriers in the Pool B. Thus Type II flows are transmitted together on all the subcarriers in Pool B.

Type III flows are mapped to the subcarriers in Pool B in accordance with the CSH strategy. Accordingly, all Type II and Type III flows are grouped together and share all the subcarriers in Pool B. Although Type III flows do not need protection, they have predictable data rates and it can be advantageous for improving subcarrier utilization and reducing service time to put Type II flows and Type III flows together. Thus Type II and Type III flows are transmitted together on all the subcarriers in Pool B.

Type IV flows are mapped to the subcarriers in Pool C in accordance with the CSH technique. Because their unpredictable data rates may have a harmful impact on other flows, and because they do not need protection, Type IV flows are grouped together and assigned to share all the available subcarriers in Pool C. Thus Type IV flows are transmitted together on all the subcarriers in Pool C.

Type I flows can be called Exclusive Flows since each of them is carried independently by different subcarriers; the other three types may be regarded as Inclusive Flows. CFSM attempts to exploit the advantages of both CSH and CSP so as to provide protection for flows that require protection, to improve subcarrier utilization, and to lower service time simultaneously.

Figure 8:
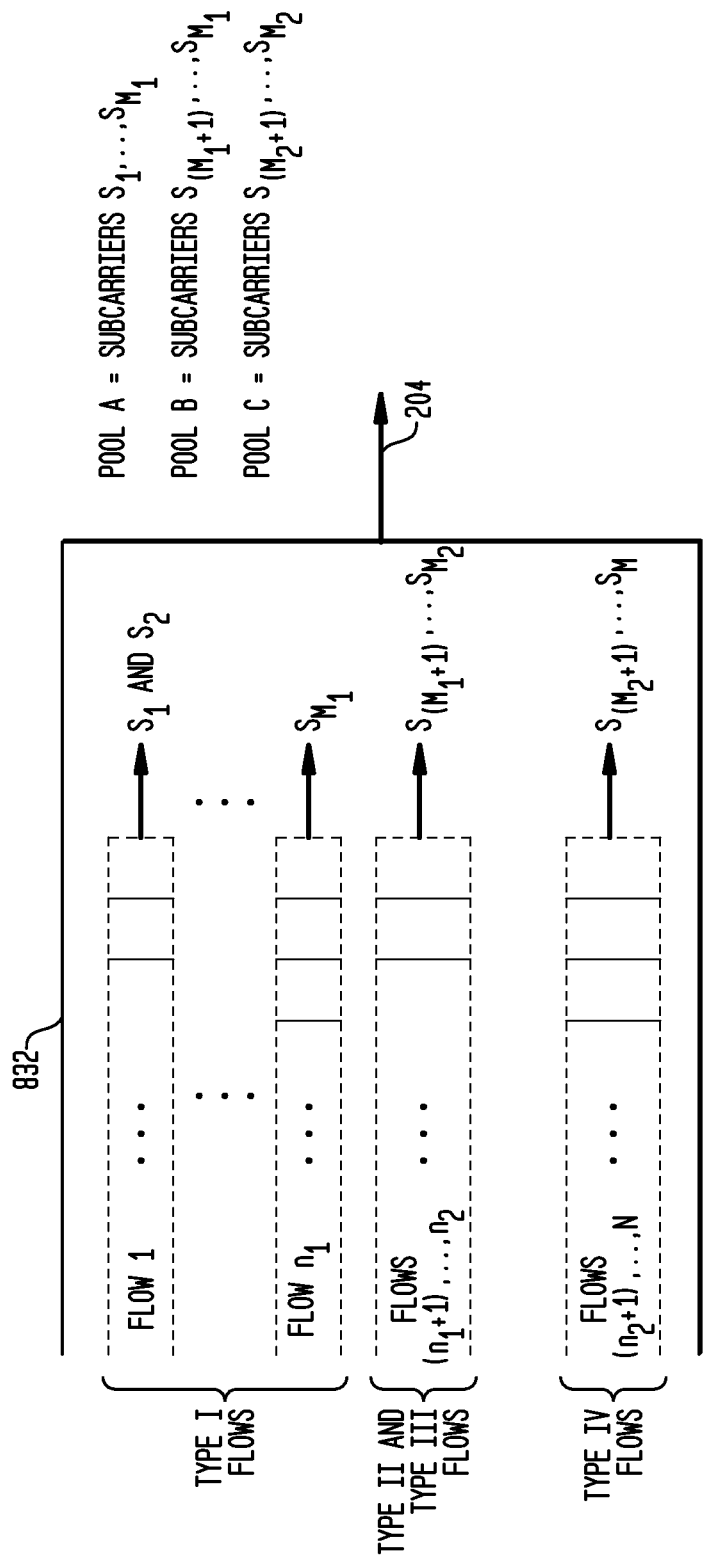
FIG. 8 illustrates a signal in which data flows are mapped to subcarriers in accordance with a class-based flow-subcarrier mapping strategy, in accordance with an embodiment of the invention.

FIG. 8 illustrates a signal in which data flows are mapped to subcarriers in accordance with a class-based flow-subcarrier mapping strategy, in accordance with an embodiment of the invention. Signal 832, which is transmitted via link 204, comprises subcarriers $s_1, \ldots, s_M$. Flows 1 to $n_1$ are Type I flows; each of them is mapped to different subcarriers selected from Pool A, which includes subcarriers $s1, \ldots, s_{m1}$. Flows ($n_1$+1) to $n_2$ include Type II flows and Type III flows. They share the subcarriers in Pool B, which includes subcarriers $s_{(m1+1)}, \ldots, s_{m2}$. Flows (n2+1) to N are Type IV flows and are mapped to all subcarriers in the pool C, which include subcarriers $s_{(m2+1)}, \ldots, s_M$. Note that a Type I flow may be assigned and mapped to multiple subcarriers if it has a large requested data rate. For example, in FIG. 8, Flow 1 is assigned to subcarriers $s_1$ and $s_2$.

Figure 9:
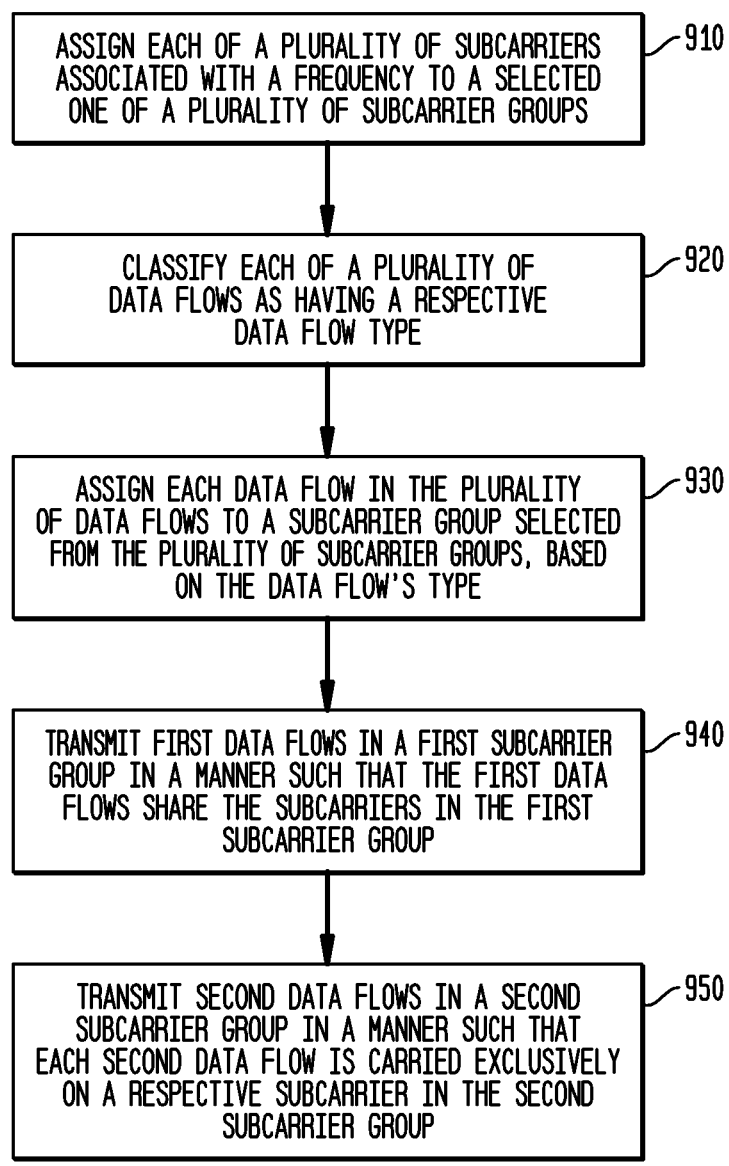
FIG. 9 is a flowchart depicting a method for transmitting data flows on selected subcarriers, in accordance with an embodiment of the invention.

FIG. 9 is a flowchart depicting a method for transmitting data flows on selected subcarriers, in accordance with an embodiment of the invention. At step 910, each of a plurality of subcarriers associated with a frequency is assigned to a selected one of a plurality of subcarrier groups. At step 920, each of a plurality of data flows is classified as having a respective data flow type. At step 930, each data flow in the plurality of data flows is assigned to a subcarrier group selected from the plurality of subcarrier groups, based on the respective data flow's type. At step 940, first data flows in a first subcarrier group are transmitted in a manner such that the first data flows share the subcarriers in the first subcarrier group. Thus, first data flows in the first subcarrier group are transmitted together on all the subcarriers in the first subcarrier group. At step 950, second data flows in a second subcarrier group are transmitted exclusively on respective subcarriers in the second subcarrier group.

In an embodiment of the invention, the steps shown in FIG. 9 are performed by flow-subcarrier mapping module 265 (shown in FIG. 2). In some embodiments, the method steps described in FIG. 9 are defined by computer program instructions that are stored in memory 259 of router 102 and executed by processor 257. In one example, flow-subcarrier mapping module 265 comprises computer program instructions implemented as computer executable code appropriately programmed by one skilled in the art to perform the algorithm defined by the method steps described in FIG. 9. By executing the computer program instructions, processor 257 executes the algorithm defined by the method steps of FIG. 9.

It should also be noted that although all subcarriers are grouped into three pools, boundaries among the pools are dynamically adjustable. Thus, a subcarrier may migrate from one pool to another and vice versa. Subcarrier migration is actually related to how idle subcarriers are allocated. Two basic principles governing subcarrier migration are: 1) idle channels, if re-assigned to pool B and C, will help to greatly reduce service time in both pools since they use the Complete Sharing strategy; and 2) re-assigning idle subcarriers to Pool A may not always be beneficial since Type I flows in Pool A are handled in accordance with the Complete Separation strategy. As a result, the following principles are used for subcarrier migration and re-assignment. First, idle subcarriers are re-assigned to new incoming Type I flows. Second, new idle subcarriers released from Pool A due to the departure of a Type I flows is re-assigned to Pool B or C.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of transmitting data over a communication network, wherein a plurality of data flows are carried by respective subcarriers using orthogonal frequency division multiplexing, the method comprising:
classifying each of a plurality of data flows as having a respective data flow type;
assigning each data flow to one of a plurality of subcarrier groups, based on the data flow's type, wherein each subcarrier group comprises a respective plurality of subcarriers;
transmitting first data flows assigned to a first subcarrier group exclusively on respective subcarriers in the first subcarrier group; and
transmitting second data flows assigned to a second subcarrier group together on all of the subcarriers in the second subcarrier group;
wherein flow-subcarrier mapping (FSM) with said transmitting steps includes following constraints:

$$a) \; 0 \leq \sum_{1 \leq j \leq M} I_{i,j} \leq M, \forall \; 1 \leq i \leq N;$$

$$b) \; \sum_{1 \leq j \leq M} P_{i,j} \leq 1.0, \forall \; 1 \leq i \leq N;$$

$$c) \; \sum_{1 \leq j \leq M} (\lambda^* P_{i,j}) < R, \forall \; 1 \leq i \leq M; \text{ and}$$

$$d) \; \sum_{1 \leq j \leq M} \lambda < M * R;$$

where R denotes data rate, M denotes optical OFDM subcarriers, N denotes traffic flows, $\lambda$ is related to traffic intensity, ij denoting $i^{th}$ data flow mapped to $j^{th}$ subcarrier and Pi,j denoting percentage of $i^{th}$ data flow's traffic that is assigned to $j^{th}$ subcarrier.

2. The method of claim 1, wherein: the communication network comprises an optical network.

3. The method of claim 2, wherein the communication network comprises at least one of an in access/metro optical network, a home optical network, a core optical network, and a virtual passive optical network.

4. The method of claim 1, wherein the step of classifying each of a plurality of data flows as having a respective data flow type further comprises:
classifying each data flow based at least in part on whether or not the data flow has a predictable data rate.

5. The method of claim 4, wherein the step of classifying each of a plurality of data flows as having a respective data flow type further comprises: classifying each data flow based at least in part on whether or not the data flow needs protection.

6. The method of claim 5, wherein the step of classifying each of a plurality of data flows as having a respective data flow type further comprises:
classifying each data flow as having a data flow type selected from: a first data flow type that does not have a predictable data rate and needs protection, a second data flow type that has a predictable data rate and needs protection, a third data flow type that has a predictable data rate and does not need protection, and a fourth data flow type that does not have a predictable data rate and does not need protection.

7. The method of claim 6, wherein the step of assigning each data flow to one of a plurality of subcarrier groups further comprises:
assigning data flows of the first data flow type to the first subcarrier group;
assigning data flows of the second and third data flow types to the second subcarrier group; and
assigning data flows of the fourth data flow type to a third subcarrier group.

8. The method of claim 7, further comprising:
transmitting third data flows assigned to the third subcarrier together on all of the subcarriers in the third subcarrier group.

9. The method of claim 8, further comprising re-assigning a subcarrier that is not in the first subcarrier group to the first subcarrier group when the subcarrier becomes idle.

10. The method of claim 8, further comprising: re-assigning a subcarrier that is in the first subcarrier group to the second or third subcarrier group when the subcarrier becomes idle.

11. An apparatus for transmitting data over a communication network, wherein a plurality of data flows are carried by respective subcarriers using orthogonal frequency division multiplexing, the apparatus comprising:
means for classifying each of a plurality of data flows as having a respective data flow type;
means for assigning each data flow to one of a plurality of subcarrier groups, based on the data flow's type, wherein each subcarrier group comprises a respective plurality of subcarriers;
means for transmitting first data flows assigned to a first subcarrier group exclusively on respective subcarriers in the first subcarrier group; and
means for transmitting second data flows assigned to a second subcarrier group together on all of the subcarriers in the second subcarrier group;
wherein flow-subcarrier mapping (FSM) with said transmitting (means) includes following constraints:

a) $0 \leq \sum_{1 \leq j \leq M} I_{i,j} \leq M, \forall\ 1 \leq i \leq N;$ b) $\sum_{1 \leq j \leq M} P_{i,j} \leq 1.0, \forall\ 1 \leq i \leq N;$ c) $\sum_{1 \leq j \leq M} (\lambda^* P_{i,j}) < R, \forall\ 1 \leq i \leq M;$ and d) $\sum_{1 \leq j \leq M} \lambda < M * R;$ where R denotes data rate, M denotes optical OFDM subcarriers, N denotes traffic flows, $\lambda$ is related to traffic intensity, i,j denoting $i^{th}$ data flow mapped to $j^{th}$ subcarrier and $P_{i,j}$ denoting percentage of $i^{th}$ data flow's traffic that is assigned to $j^{th}$ subcarrier.

12. The apparatus of claim 11, wherein: the communication network comprises an optical network.

13. The apparatus of claim 11, wherein the means for classifying each of a plurality of data flows as having a respective data flow type further comprises:
means for classifying each data flow based at least in part on whether or not the data flow has a predictable data rate.

14. The apparatus of claim 13, wherein the means for classifying each of a plurality of data flows as having a respective data flow type further comprises:
means for classifying each data flow based at least in part on whether or not the data flow needs protection.

15. The apparatus of claim 14, wherein the means for classifying each of a plurality of data flows as having a respective data flow type further comprises:
means for classifying each data flow as having a data flow type selected from: a first data flow type that does not have a predictable data rate and needs protection, a second data flow type that has a predictable data rate and needs protection, a third data flow type that has a predictable data rate and does not need protection, and a fourth data flow type that does not have a predictable data rate and does not need protection.

16. The apparatus of claim 15, wherein the means for assigning each data flow to one of a plurality of subcarrier groups further comprises:
means for assigning data flows of the first data flow type to the first subcarrier group;
means for assigning data flows of the second and third data flow types to the second subcarrier group; and
means for assigning data flows of the fourth data flow type to a third subcarrier group.

17. The apparatus of claim 16, further comprising:
means for transmitting third data flows assigned to the third subcarrier together on all of the subcarriers in the third subcarrier group.

18. The apparatus of claim 17, further comprising:
means for re-assigning a subcarrier that is not in the first subcarrier group to the first subcarrier group when the subcarrier becomes idle.

19. The apparatus of claim 17, further comprising:
means for re-assigning a subcarrier that is in the first subcarrier group to the second or third subcarrier group when the subcarrier becomes idle.

* * * * *